United States Patent [19]

Moore

[11] Patent Number: 5,308,646
[45] Date of Patent: May 3, 1994

[54] METHOD OF SIMULATING NATURAL DESERT VARNISH

[75] Inventor: Carleton B. Moore, Tempe, Ariz.

[73] Assignee: Arizona Board of Regents, Tempe, Ariz.

[21] Appl. No.: 572,194

[22] Filed: Aug. 23, 1990

[51] Int. Cl.$^5$ .......................... B05D 1/02; C09C 1/22
[52] U.S. Cl. .................................. 427/136; 427/140; 428/919; 428/16; 428/15; 106/456; 106/459; 106/463; 106/500
[58] Field of Search ...................... 427/136, 140, 126.1, 427/126.3; 156/61; 428/919, 15, 16; 106/456, 459, 463, 500

[56] References Cited

U.S. PATENT DOCUMENTS

| | | | |
|---|---|---|---|
| 333,457 | 12/1885 | Foster | 427/283 |
| 3,650,708 | 3/1972 | Gallagher | 204/30 |
| 3,955,018 | 4/1976 | Liberto et al. | 427/16 |
| 4,082,871 | 4/1978 | Peters | 427/15 |
| 4,725,451 | 2/1988 | Cripe | 427/136 |
| 4,812,340 | 3/1989 | Cripe | 156/61 |

OTHER PUBLICATIONS

CA Abstract 112:10810j; "Aqueous Solution for Applying an Artificial Patina" Kato, K. (JP 01-062479) 8 Mar. 1989.

Primary Examiner—Karl Group
Assistant Examiner—Scott L. Hertzog
Attorney, Agent, or Firm—Richard R. Mybeck

[57] ABSTRACT

Means, methods and compositions for simulating natural desert varnish. A solution containing soluble metallic acetate salts selected from the group consisting of iron (II), manganese(II) and mixtures thereof and indigenous clay when appropriate is sprayed on distressed or abused natural or artificial rock to produce a preselected patina which is compatible to the indigenous area.

10 Claims, No Drawings

METHOD OF SIMULATING NATURAL DESERT VARNISH

INTRODUCTION

The present invention relates to a means and methods of simulating in a matter of days, the desert varnish produced by nature over decades and longer periods of time. The invention further relates to articles of manufacture simulating the surface appearance of natural desert varnish.

BACKGROUND OF THE INVENTION

Much of the desert areas, both valleys and mountains, found in arid and semi-arid regions of the United States and other parts of the world are covered by a thin coating of generally dark coloration commonly called "desert varnish". For example, in the Southern California and Arizona deserts, this varnish covers the majority of the coherent-stable rock surface including mountain ranges. In some areas of Southern California desert varnish has been reported to be formed in as little as twenty-five years after exposure of fresh rock. However, in other areas, such as Arizona, petroglyphs documented to have been formed four hundred to a thousand years ago by scraping away desert varnish coatings have not been covered by the re-establishment of the desert varnish. In Egypt desert varnish is barely perceptible on pyramids that have existed for more than 5,000 years.

In desert areas, man's activities, such as in the construction of dams, roads, preparation of sites for construction and other activities of a like nature have exposed large, unsightly areas of lightly colored glaring scarps of freshly exposed rock which are visible from great distances as unsightly anomalies on the desert landscape. The removal of the natural desert varnish in this fashion occurs in both urban and rural areas and is particularly objectionable in the highly visible mountain areas; for example, where large cuts and fills are made to accommodate building sites and major roadways.

Nature's timetable in restoring the desert varnish to the freshly exposed rock is much too long and in some cases extends over centuries. Therefore, a real and urgent need exists for means methods and products which can be used to restore the natural desert varnish or to cover the exposed areas with a suitable substance of manufacture which will at least engender or simulate desert varnish coated natural rock.

One prior art effort to realize a solution to this problem included shocking exposed rock with caustic solutions and thereafter painting the pre-treated rock with one or more metallic salts, preferably those of manganese and/or iron in the form of chlorides, sulfates and nitrates. While obtaining amelioration of the eyesores to a modest degree, this procedure was environmentally unfriendly, labor intensive and prone to washing if subjected to inclement weather during the cycle prescribed. Thus, the procedure was sometimes ineffectual in unequivocally obtaining the substantially permanent uniform visual repair desired.

Accordingly, a need still exists for providing means and methods to restore disturbed rock beds and mountainsides to a natural look in an environmentally friendly, economically viable manner. It is toward the satisfaction of these needs that the present invention is directed.

BRIEF SUMMARY OF THE INVENTION

The present invention relates generally to means, methods and compositions for restoring a natural patina to disturbed rock and hillside surfaces and to the creation of a natural patina on artificial rock such as concrete. More particularly, the present invention relates to means and methods of applying a specially formulated composition, herein called "desert varnish", to such surfaces which upon a limited period of oxidation will create a natural appearing surface. The composition hereof is prepared to simulate a natural texture, the color of which can be adjusted to produce a coating having shades ranging from a light brown to a reddish black, depending on the terrain onto which the restoration is carried out or the color desired. The color adjustments are obtained by varying the active components, and by varying relative proportions of the several components which are used to create the solution to be applied.

Specifically, the composition hereof comprises a blended solution of manganese acetate and iron acetate, each of which will range from about 0.01 to 2 molar in strength depending on the result desired. In one practice of the present invention, the manganese acetate and iron acetate solution is formulated by the addition, with stirring, of an ammonium, sodium, potassium or like salt of acetic acid to a soluble manganese or iron compound such as the sulfate, chloride or nitrate. The resulting solution is then applied to the selected surface in a single step by spray or brush, and allowed to dry. The acetates, when so formed and deployed proceed to oxidize and will achieve the desired patina in a period of about ten days. The solution may be augmented with indigenous clays to effectuate the precise color, texture or thickness desired which will match the indigenous color of the surroundings.

In another practice of the present invention the pure acetate salts, usually can be mixed directly into the water solvent.

Accordingly, a principal object of the present invention is to provide novel and unique methods and compositions for imparting or restoring a natural patina to disturbed or artificial rock without requiring the use of environmentally unfriendly caustic or acidic materials or time and labor consuming pretreatments.

Another object of the present invention is to provide a new and improved methodology for imparting or restoring a natural patina to disturbed or artificial rock which is simple to apply, resistant to weather, and chemically neutral relative to the environment.

These and still further objects as shall herein after appear are fulfilled by the present invention in a remarkably unexpected fashion as will be readily discerned from the following detailed description of the preferred embodiments hereof.

DESCRIPTION OF THE PREFERRED EMBODIMENTS

A 0.01 to 2 molar aqueous solution of metallic acetate selected from the group consisting of iron, manganese, and combinations thereof, is created using conventional mixing techniques. The solution may be made by introducing dry manganese acetate and/or iron acetate into water or by adding a preselected amount of an acetic acid salt such as ammonium, sodium or potassium acetate, to a solution containing a soluble manganese or iron compound such as a sulfate, chloride or nitrate.

A rock surface that is, a surface which has no natural desert varnish, or a surface which has had its natural desert varnish covering disturbed, is selected. The acetate solution, prepared as indicated, is applied to the disturbed rock surface in a single step as by brushing or spraying. As the applied solution begins to dry, it will oxidize and color will begin to develop. In a period of approximately ten days, the applied varnish solution will attain its desired color. The above solution may be utilized to produce a color ranging from light brown to black by varying the manganese:iron ratio in the solution and, when indicated, by the addition of indigenous clays to the solution.

Clay, when added to the solution, will further vary the color, testure and thickness produced when the solution is applied and cured thereby allowing the resulting patina to more nearly match the physical appearance of the natural aged rock disposed in close proximity to the surfaces selected to receive the application of the remedial solution. In practice, any chemical source of soluble manganese (II), iron (II), and acetate ions may be used to form the solution including the pure acetate salts of manganese(II) and iron(II).

The compositions and methodology hereof are especially useful for those builders who must comply with strict Hillside Building Regulations currently enforced by many desert and mountain communities such, for example, as Paradise Valley, Ariz.

To further assist in the understanding of the present invention and not by way of limitation, the following examples are presented:

EXAMPLE 1

A plurality of iron-II acetate solutions were prepared by mixing solutions of iron sulfate and sodium acetate. The resulting solutions were applied to scarred granitic and quartzite rocks in the concentrations listed below and allowed to age. The colors developed ranged from brown to light rusty orange, using the color code adopted in the Geological Society of America, Roche Color Chart, reprinted 1980.

The iron sulfate [heptahydrate] and sodium acetate are mixed in the ratio by weight of 1.9 sulfate to 1 of acetate. The mixture was mixed in water to form the concentrations shown in table I.

TABLE I

| Weight of dry Mixture/Liter soln. | Color Obtained | Color Code |
|---|---|---|
| 240 g | moderate brown | (5 YR 4/4) |
| 120 g | moderate yellowish brown | (10 YR 5/4) |
| 60 g | grayish orange | (10 YR 7/4) |

EXAMPLE 2

Several manganese II acetate solutions were prepared in varying concentrations as shown in TABLE II and applied to concrete block walls and scarred granitic rocks. The colors developed successfully and ranged from black to grayish orange as shown.

TABLE II

| Manganese II acetate tetrahydrate concentration (Molar) | grams/ liter | Color Obtained | Color Code |
|---|---|---|---|
| 2 | 500 | blackish red | (5 RR 2/2) |
| 1 | 245 | dusky brown | (5 YR 2/2) |
| 0.5 | 123 | grayish brown | (5 YR 3/2) |

TABLE II-continued

| Manganese II acetate tetrahydrate concentration (Molar) | grams/ liter | Color Obtained | Color Code |
|---|---|---|---|
| 0.25 | 61 | dark yellowish brown | (10 YR 4/2) |
| 0.1 | 24.5 | moderate yellowish brown | (10 YR 5/4) |
| 0.05 | 13 | grayish orange | (10 YR 7/4) |

EXAMPLE 3

Various concentrations of mixture of iron and manganese sulfate in sodium acetate were prepared mixing 0.3 kg of manganese sulfate heptahydrate with 0.05 kg of iron sulfate heptahydrate and 0.22 kg of sodium acetate with one liter of water.

The colors developed successfully and ranged from dusky brown to grayish orange as shown in TABLE III.

TABLE III

| Mixture (grams/liter) | Color Obtained | Color Code |
|---|---|---|
| 250 | dusky brown | (5 YR 2/2) |
| 125 | grayish brown | (5 YR 3/2) |
| 62 | dark yellowish brown | (10 YR 4/2) |
| 30 | grayish orange | (10 YR 7/4) |

EXAMPLE 4

Approximately fifty square feet of freshly exposed (no desert varnish formed since disturbed) granite rock was sprayed with a mixture of 120 grams of manganese sulfate tetrahydrate and sodium acetate prepared accordingly to Example 2 and admixed in a liter of water. The entire area was sprayed with a portable hand-pressurized garden sprayer until a dark coating resulted from the treatment and within ten to fourteen days after the treatment, a moderate yellowish orange patina resembling naturally occurring desert varnish developed on the treated site.

The composition and process of this invention has been found effective on a variety of igneous, metamorphic, sedimentary and artificial rocks including: basalt, andesite rhyolite, diorite, gabbro, metarhyolite, quartzite, phyllite, schist, gneiss, hornfels, sandstone, conglomerate, graywacke, chert, siliceous carbonates and concrete. It should be noted, however, that readily soluble and unstable rock surfaces such as pure limestone and stone while accepting, will not maintain the surface over long periods of time because friable sedimentary rocks and unstable slopes will take, but not support, the coatings because of their propensity for continued erosion.

A number of specific examples of the preferred embodiments of the practice of this invention has been set forth above, and from the teachings of this disclosure persons ordinarily skilled in the art will appreciate that other and different embodiments may be devised without undue experimentation, all of which are within the spirit and scope of this disclosure and the invention covered thereby. For example, although the preferred embodiment of the process at present contemplates the application of the chemicals to the substrate by spraying, other methods of applying the chemicals may be used, such as brushing, dipping, and the like.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A method of simulating natural desert varnish comprising preparing a solution containing metallic ions selected from the group consisting of iron (II) and manganese (II), having a molarity from about 0.01 to 2, and acetate ions; applying said solution to a selected rock surface upon which it is desired to form an artificial coloration; and allowing said solution to dry and oxidize to form said coloration.

2. A method according to claim 1 in which said metallic ion is selected from the group consisting of the chlorides, sulfates and nitrates of iron and manganese.

3. A method according to claim 1 in which said acetate ions are selected from the group consisting of ammonium, sodium, and potassium acetic acid salts.

4. A method according to claim 1 in which said solution contains ions of only one metal.

5. A method according to claim 1 in which clay is added to said solution in an amount sufficient to vary the color, texture and thickness of said coloration.

6. A method according to claim 1 in which said coloration ranges from light brown to black.

7. A method according to claim 1 in which said metallic ions include ions of both manganese and iron.

8. The method of restoring a natural patina to a disturbed hillside comprising preparing a water solution of metallic ions selected from the group consisting of the chloride, sulfate and nitrate of manganese and iron admixed with an acetate selected from the group consisting of the acetic acid salts of ammonium, sodium and potassium; spraying said solution on said disturbed hillside; drying said solution; and oxidizing said solution to create said natural patina.

9. A method according to claim 8 in which said acetate ions are selected from the group consisting of ammonium, sodium, and potassium acetic acid salts.

10. A method according to claim 8 in which said coloration ranges from light brown to black.

* * * * *